J. O. HEINZE.
ELECTRIC STEERING MECHANISM.
APPLICATION FILED SEPT. 16, 1915.

1,231,885. Patented July 3, 1917.

Witnesses
Chas. W. Stauffiger
Karl N. Butler

Inventor
John O. Heinze,
By Bartlet & Bartlet
Attorneys

UNITED STATES PATENT OFFICE.

JOHN O. HEINZE, OF DETROIT, MICHIGAN, ASSIGNOR TO THE JOHN O. HEINZE COMPANY, OF SPRINGFIELD, OHIO, A CORPORATION OF OHIO.

ELECTRIC STEERING MECHANISM.

1,231,885.

Specification of Letters Patent.

Patented July 3, 1917.

Application filed September 16, 1915. Serial No. 50,931.

*To all whom it may concern:*

Be it known that I, JOHN O. HEINZE, a citizen of the United States of America, residing at Detroit, in the county of Wayne and State of Michigan, have invented certain new and useful Improvements in Electric Steering Mechanism, of which the following is a specification, reference being had therein to the accompanying drawings.

This invention relates to an electrical steering device which has been particularly designed for automobiles having the conventional front axle knuckles and a connecting rod between the knuckles whereby the same may be moved in synchronism.

One of the objects of my invention is to utilize the connecting rod of steering knuckles as a reciprocable member concentric of a reversible motor employed for reciprocating the member and imparting movement to the steering knuckles, said motor being controlled by a switch which is easily operated in contradistinction to a steering wheel, steering handle or similar device subjected to stresses and strains by the steering mechanism and requiring constant attention and manipulation upon the part of a chauffeur or automobile operator.

A further object of my invention is to provide a motor driven vehicle with electrically controlled steering mechanism so arranged as to apply the power directly to the steering knuckles without the interposition of universal joints or other flexible driving connections, thus eliminating lost motion and consequent inaccuracies in directing the vehicle and holding it to its course as well as obviating accidents due to such play or lost motion, and further to provide an arrangement whereby the power will be quickely applied to direct the vehicle in any desired direction.

A still further object of my invention is to provide an electric steering device which in its general construction and arrangement of parts is such as to withstand vibration and may be quickly and easily installed upon automobiles as commonly constructed and when embodied as a distinctive feature of such vehicles adds a factor of safety and gives greater comfort and liberties to a chauffeur than the present type of wheel controlled manually operated steering mechanism.

The above are a few of the objects and advantages gained by an electric steering device constructed in accordance with my invention, and reference will now be had to the drawings illustrative of the invention wherein—

Figure 1:
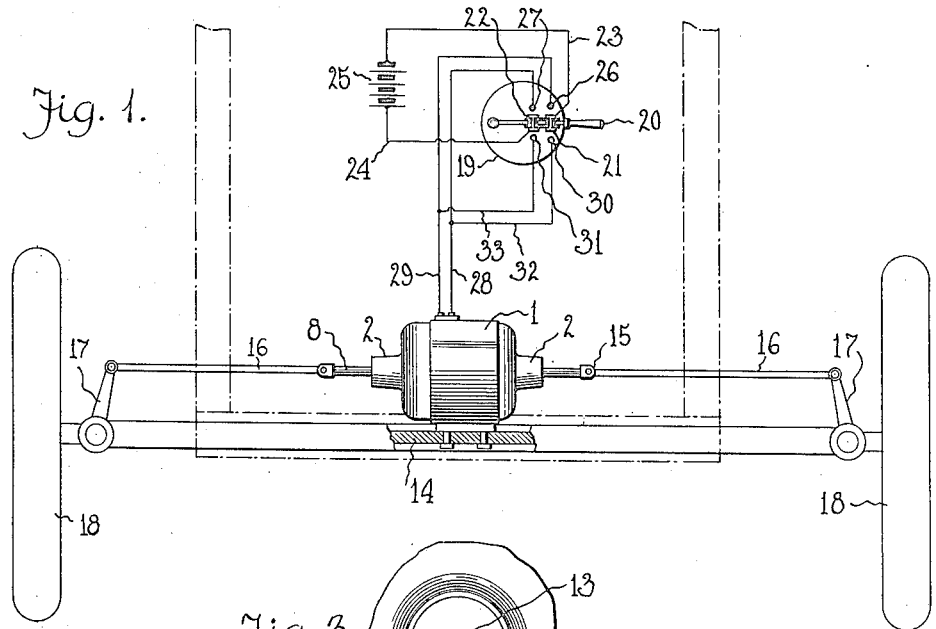
Figure 1 is a plan view of an electric steering device embodying the invention, showing the same in connection with portions of an automobile and electrical wiring which have been diagrammatically illustrated.
Figure 3:
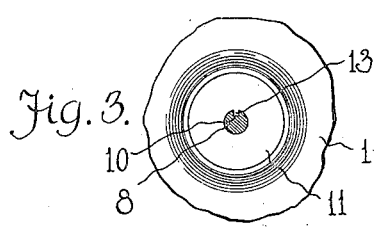
Fig. 3 is a cross sectional view taken on the line III—III of Fig. 2.
Figure 2:
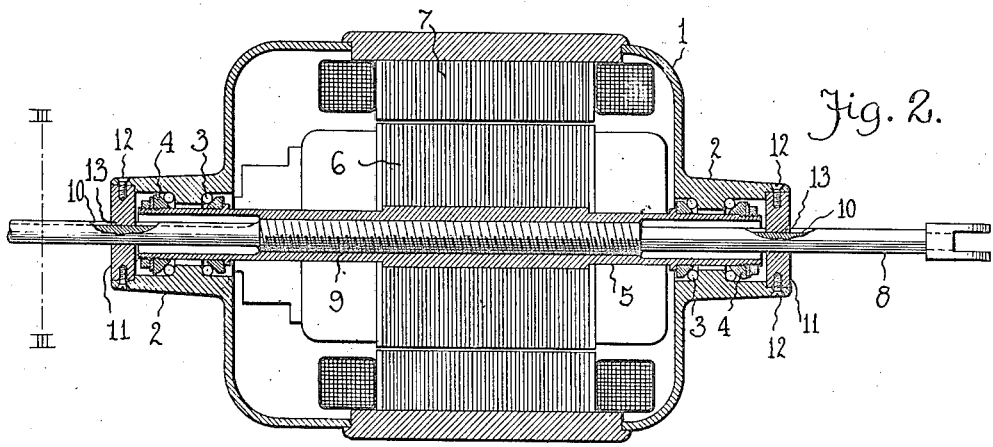
Fig. 2 is a longitudinal sectional view of a conventional form of reversible motor provided with a reciprocable connecting rod member in accordance with my invention.

In the drawing, the reference numeral 1 denotes a motor casing having end bearings 2 affording outer races for anti-frictional balls 3 engaging and supporting inner races in the form of collars 4 mounted upon the ends of a tubular nut or sleeve 5. This tubular nut or sleeve 5 is concentric with and fixed relative to an armature 6, which is revoluble in the field 7 of the motor inclosed by the casing 1, said motor being reversible and of the ordinary and well known type employed in connection with any suitable source of electrical energy for imparting movement to the armature 6 in a desired direction.

In screwthreaded engagement with the tubular nut or sleeve 5 is a reciprocable connecting member 8 having an intermediate threaded portion 9 and provided in its outer end portions with longitudinal grooves or ways 10. These outer ends of the member 8, are slidable in heads 11 detachably secured in the ends of the bearings 2, said heads being held by screws or other fastening means 12, and each head has a spline or key 13 engaging the groove or spline way 10 in each outer end of the member 8. With the heads 11 fixed relative to the motor casing 1, the connecting member 8 is held against rotation, but is free to reciprocate longitudinally and concentrically of the motor casing, and as these elements are assembled, it is impossible for the same to become accidentally displaced or injured by vibration or strains during the normal operation of the automobile.

The casing 1 of the motor is firmly secured in any suitable manner to a fixed member at the front end of an automobile, preferably to the rear side of the axle 14, so that the ends of the member 8 may be connected, as at 15 by links or rods 16 to the steering knuckles 17 of the steering wheels 18 of the automobile. The links or rods 16 coöperate with the member 8 in providing a reciprocable sectional connecting rod by which the steering knuckles 17 are moved in synchronism to guide and steer the wheels 18 in a desired direction.

Controlling the operation of the reversible motor is a suitable electrical control, which may be in the form of a switch or control board 19 adapted to be located convenient to the chauffeur or operator of an automobile. Obviously other forms of control employing a hand wheel or other means for operating the contact devices may be employed. Pivoted or otherwise movable upon the control board 19 is a switch arm 20 provided with insulated contact members 21 and 22 connected by wires 23 and 24 to a suitable source of electrical energy, as battery cells 25.

At one side of the switch arm 20, are contact pieces 26 and 27 connected by wires 28 and 29 to the motor. At the opposite side of the switch arm 20 are contact pieces 30 and 31 connected by wires 32 and 33 to the wires 28 and 29 respectively.

When the switch arm 20 is moved to place the contact members 21 and 22 in engagement with the contact pieces 26 and 27 respectively, the following circuit is completed; battery 25 by wire 23 to contact member 21, contact piece 26 by wire 29 to the motor, by wire 28 to contact piece 27 and contact member 22, and by wire 24 to the battery 25, thus completing a circuit which operates the motor in one direction.

When the switch arm 20 is shifted to place the contact members 21 and 22 in engagement with the contact pieces 30 and 31 respectively, a circuit is completed to operate the motor in a reverse direction, to wit; battery 25 by wire 24 to contact member 22, contact piece 31 by wires 33 and 29 to the motor, by wires 28 and 32 to contact piece 30 and contact member 21, and then by wire 23 to the battery 25.

With the switch arm 20 in a neutral position, the steering wheels of the automobile remain in the position to which they have been adjusted, and the direction of travel can be easily changed by moving the switch arm 20 to the right or left for such a period of time as will cause the motor to reciprocate the sectional connecting member of the wheel knuckles.

One embodiment of my invention has been illustrated and it is to be understood that the structural elements are susceptible to such variations and modifications as fall within the scope of the appended claims.

What I claim is:—

1. In a steering device, the combination with steering wheel knuckles and a suitable source of electrical energy, of an electrical device in a normally open circuit with said source of electrical energy, a rod extending through said electrical device and adapted for reciprocation thereby, and means in circuit with said electrical device and said source of electrical energy adapted for controlling the operation of said electrical device.

2. In an electric steering device, the combination with steering wheel knuckles, of a reversible motor and a suitable source of electrical energy therefor, a tubular nut concentric with said motor and adapted to be revolved thereby, a rod extending through said tubular nut and connected to said steering wheel knuckles and adapted to be reciprocated by said nut, and means in connection with the source of electrical energy for said motor, adapted to control the operation of the same.

3. In an electric steering device, the combination with steering wheel knuckles, a reversible motor, and a suitable source of electrical energy therefor, of bearings at the ends of said motor, a tubular nut journaled in said bearings concentric with said motor and adapted to be revolved thereby, a sectional connecting rod connecting said steering wheel knuckles and extending through said nut and adapted to be reciprocated thereby, and a movable switch arm adapted to control the operation of said motor.

4. In an electric steering device, the combination with an axle and steering knuckles on the ends of said axle, of a reversible electric motor rigidly secured to the axle and having a tubular axial member, a member passing through and having operative connection with the tubular member of the motor to be reciprocated thereby and operatively connected at its ends with the said knuckles, a source of electrical energy, and means for controlling said motor.

In testimony whereof I affix my signature in presence of two witnesses.

JOHN O. HEINZE.

Witnesses:
ANNA M. DORR,
LEWIS E. FLANDERS.